(12) United States Patent
Lasiter et al.

(10) Patent No.: US 11,277,559 B2
(45) Date of Patent: Mar. 15, 2022

(54) IMAGE SENSOR SYSTEM

(71) Applicant: QUALCOMM Incorporated, San Diego, CA (US)

(72) Inventors: Jon Lasiter, Stockton, CA (US); Evgeni Gousev, Saratoga, CA (US); Ravindra Vaman Shenoy, Dublin, CA (US); Russell Gruhlke, San Jose, CA (US); Khurshid Syed Alam, Mountain View, CA (US); Kebin Li, Fremont, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/857,045

(22) Filed: Apr. 23, 2020

(65) Prior Publication Data

US 2020/0344413 A1 Oct. 29, 2020

Related U.S. Application Data

(60) Provisional application No. 62/839,588, filed on Apr. 26, 2019.

(51) Int. Cl.
*H04N 5/232* (2006.01)
*H04N 5/225* (2006.01)

(52) U.S. Cl.
CPC ....... *H04N 5/23238* (2013.01); *H04N 5/2253* (2013.01); *H04N 5/2254* (2013.01); *H04N 5/2258* (2013.01)

(58) Field of Classification Search
CPC ............. H04N 5/23238; H04N 5/2258; H04N 5/2254; H04N 5/2253
See application file for complete search history.

(56) References Cited

U.S. PATENT DOCUMENTS

| | | | |
|---|---|---|---|
| 2008/0093560 A1* | 4/2008 | Puhakka | H01L 27/14634 250/370.08 |
| 2018/0020160 A1* | 1/2018 | Lin | H04N 5/2252 |
| 2021/0144299 A1* | 5/2021 | Nakata | H01L 27/14618 |

FOREIGN PATENT DOCUMENTS

| | | |
|---|---|---|
| CN | 106817518 A | 6/2017 |
| KR | 20070062690 A | 6/2007 |
| WO | WO-2018188609 A1 | 10/2018 |

OTHER PUBLICATIONS

International Search Report and Written Opinion—PCT/US2020/029813—ISA/EPO—dated Jun. 25, 2020.

* cited by examiner

*Primary Examiner* — Tat C Chio
(74) *Attorney, Agent, or Firm* — Qualcomm Incorporated (57) ABSTRACT

In one example, an image sensor module comprises one or more covers having at least a first opening and a second opening, a first lens mounted in the first opening and having a first field of view (FOV) centered at a first axis having a first orientation, a second lens mounted in the second opening and having a second FOV centered at a second axis having a second orientation different from the first orientation, a first image sensor housed within the one or more covers and configured to detect light via the first lens, and a second image sensor housed within the one or more covers and configured to detect light via the second lens. The first image sensor and the second image sensor are configured to provide, based on the detected light, image data of a combined FOV larger than each of the first FOV and the second FOV.

13 Claims, 12 Drawing Sheets

IMAGE SENSOR SYSTEM

RELATED APPLICATION

This patent application claims priority to U.S. Provisional Patent Application Ser. No. 62/839,588, filed Apr. 26, 2019, entitled "Image Sensor Module," and which is assigned to the assignee hereof and is incorporated herein by reference in its entirety for all purposes.

FIELD

This application is generally related to image sensor, and more specifically to techniques for extending field of view (FOV) of image sensor.

BACKGROUND

An image sensor can detect and convey information used to make an image. The image sensor can capture light reflected from a scene and convert the captured light into signals. The light can include, for example, visible light, infra-red light, etc. The signals can be used to generate an image of the scene to support various applications, such as depth-sensing, location tracking, augmented reality (AR)/virtual reality (VR)/mixed reality (MR) applications, etc.

One important performance metric of an imaging system is an extent of a scene that can be imaged by the image sensor. The extent can be affected by various parameters, such as a field of view (FOV) of the image sensor, which measures an angular extent of the scene that can be imaged by the image sensor. FOV can be used interchangeably with angle of view (AOV). It is desirable that an image sensor has a wide FOV, such that the image sensor can image a larger area of a scene and can capture more information about the scene in an image.

SUMMARY

Techniques are described for improving a field of view of an image sensor. The techniques can also be used to improve a field of illumination of an illuminator.

In some embodiments, an apparatus comprises: one or more covers having at least a first opening and a second opening; a first lens mounted in the first opening and having a first field of view (FOV) centered at a first axis having a first orientation; a second lens mounted in the second opening and having a second FOV centered at a second axis having a second orientation different from the first orientation; a first image sensor housed within the one or more covers and configured to detect light via the first lens; and a second image sensor housed within the one or more covers and configured to detect light via the second lens. The first image sensor and the second image sensor are configured to provide, based on the detected light, image data of a combined FOV larger than each of the first FOV and the second FOV.

In some aspects, the apparatus further comprises a support structure having a first surface perpendicular to the first axis and a second surface perpendicular to the second axis. The first image sensor is formed on the first surface. The second image sensor is formed on the second surface.

In some aspects, the apparatus further comprises a first circuit board on which the first image sensor and the second image sensor are formed. The first circuit board is bonded with the first surface and the second surface of the support structure.

In some aspects, the first circuit board is bonded with the first surface and the second surface of the support structure with an epoxy material.

In some aspects, the apparatus further comprises a second circuit board. Two ends of the first circuit board are bonded with the second circuit board such that the support structure is sandwiched between the first circuit board and the second circuit board.

In some aspects, the two ends of the first circuit board comprise first pads. The second circuit board comprises second pads. The first pads at the two ends of the first circuit board are soldered to the second pads of the second circuit board.

In some aspects, each of the first circuit board and the second circuit board includes a rigid-flex circuit board.

In some aspects, the apparatus further comprises a processor bonded with the second circuit board and electrically connected to the first image sensor and the second image sensor. The processor is configured to: receive a first image frame from the first mage sensor corresponding to the first FOV; receive a second image frame from the second image sensor corresponding to the second FOV; and generate a combined image frame corresponding to the combined FOV based on the first image frame and the second image frame.

In some aspects, the processor is configured to generate the combined image frame based on identifying pixels of an object captured in both the first image frame and the second image frame.

In some aspects, the processor is sandwiched between the support structure and the second circuit board.

In some aspects, the processor is electrically connected to the second circuit board via at least one of: flip chip connectors, or bond wires.

In some aspects, the one or more covers include one cover mounted on the second circuit board.

In some aspects, the one or more covers include a first cover having the first opening and a second cover having the second opening. The first cover is formed on the first surface of the support structure. The second cover is formed on the second surface of the support structure.

In some aspects, the apparatus further comprises a third cover having a transparent lid. The third cover is formed on the second circuit board. The transparent lid allows light to reach the first lens and the second lens.

In some aspects, the apparatus further comprises an illuminator configured to emit the light.

In some embodiments, a method of fabricating an image sensor module is provided. The method comprises: forming electrical connections between a processor and a first circuit board; bonding a support structure onto a surface of the processor; placing a first image sensor and a second image sensor on a second circuit board; bonding the second circuit board comprising the first and second image sensors on a first surface and a second surface of the support structure, the first surface and the second surface having different orientations; forming electrical connections between the first circuit board and the second circuit board bonded to the support structure; and placing a cover having a first lens and a second lens on the first circuit board to enclose the first and second image sensors, the first lens having a first field of view (FOV) centered at a first axis perpendicular to the first surface and the second lens having a second FOV centered at a second axis perpendicular to the second surface.

In some aspects, the electrical connections between the processor and the first circuit board comprise at least one of: flip-chip connections, or bond wires. The electrical connections between the first circuit board and the second circuit board comprise at least one of: flip-chip connections, or bond wires.

In some aspects, support structure is bonded onto the surface of the processor based on an epoxy material. Forming electrically connections between the first circuit board and the second circuit board bonded to the support structure comprises using a hot bar to simultaneously solder first pads on two ends of the second circuit board onto second pads on the first circuit board.

In some aspects, each of the first circuit board and the second circuit board include a rigid-flex circuit board.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of the various embodiments. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the various embodiments as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

As described above, one important performance metric of an imaging system is a field of view (FOV) of the image sensor, which measures an angular extent of the scene that can be imaged by the image sensor. An image sensor module typically includes a lens to focus incident light onto an image sensor, and the FOV/AOV of the image sensor can be increased by, for example, increasing the aperture size of the lens, reducing the focal length of the lens. Increasing the aperture size and/or reducing the focal length can also increase optical aberrations, such as Seidel aberrations, which can increase blurriness and reduce the resolution of the imaging operation.

Disclosed are techniques that can improve the field of view of an image sensor. In one example, an imaging module may include one or more covers having at least a first opening and a second opening. The imaging module may include a first lens mounted in the first opening and having a first field of view (FOV) centered at a first axis having a first orientation, and a second lens mounted in the second opening and having a second FOV centered at a second axis having a second orientation different from the first orientation. The imaging module may further include a first image sensor housed within the one or more covers and configured to detect light via the first lens and a second image sensor housed within the one or more covers and configured to detect light via the second lens. The first image sensor and the second image sensor are configured to provide, based on the detected light, image data of a combined FOV larger than each of the first FOV and the second FOV. In some examples, the imaging module may include more than two image sensors arranged in different orientations to further enlarge the combined FOV.

By arranging two or more image sensors in different orientations to detect light, and by combining the image data provided by the image sensors, the combined FOV can become larger than the individual FOV provided by each image sensor. The widening of the FOV also does not require increasing the aperture of each of the first lens and the second lens, which allows the FOV to be widened without incurring additional optical aberrations. The resolution of the imaging operation can be improved as result.

The image module can support various applications, such as a ranging application. For example, the image module can be integrated with an illuminator to project infra-red light (e.g., light pulses, structured light carrying specific patterns, etc.) onto a scene. The image module can capture the infra-red light reflected by one or more objects in the scene. A distance between the image module and the objects can be determined based on, for example, a time-of-flight of the infra-red light pulses, orientations and/or locations of the structured infra-red light, etc.

Figure 1:
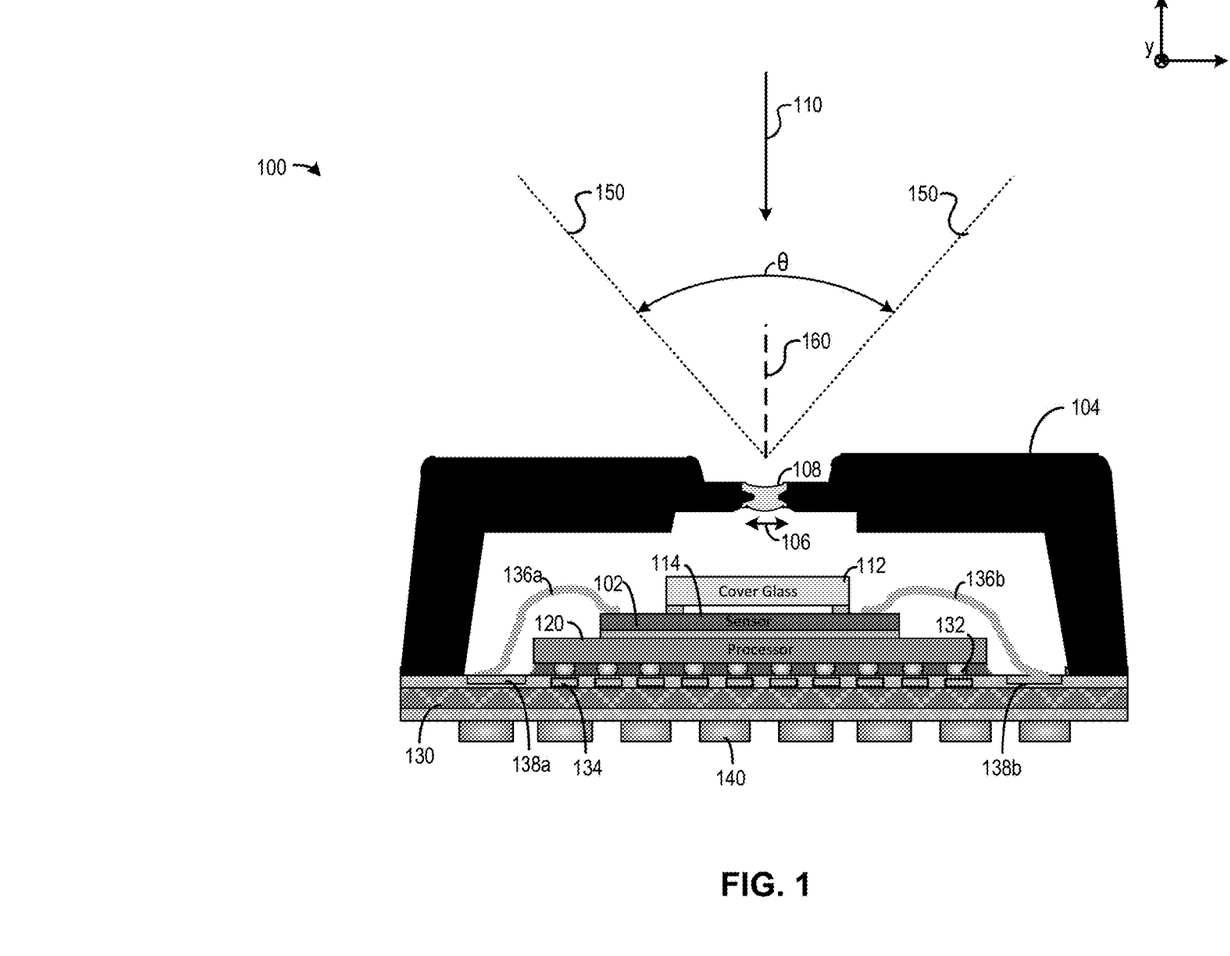
FIG. 1 illustrates an example of an image sensor module according to embodiments of the present disclosure.

FIG. 1 illustrates an image sensor module 100 according to embodiments of the present disclosure. Image sensor module 100 can be part of a mobile device such as, for example, a smart phone, a laptop, a camera, an Internet-of-Thing (IoT) device, etc. As shown in FIG. 1, sensor module 100 includes an image sensor 102 housed within a cover 104. Cover 104 can be made of a polymer material to provide physical protection and insulation to image sensor 102. Cover 104 may include an opening 106 in which a lens 108 can be mounted. Image sensor 102 can be configured to detect light 110 that passes through lens 108. Image sensor module 100 may further include a cover glass 112 mounted on a light receiving surface 114 of image sensor 102 to protect the image sensor. In some examples, image sensor module 100 can further include an optical filter array (e.g., a Bayer filter array) to control the wavelength of light received by each pixel cells.

Image sensor 102 may include a pixel cell array formed below light receiving surface 114. Each pixel cell within the array can pixel data representing an intensity of light 110 received by the pixel cell. The pixel data from the pixel cells can provide an image of a scene. Sensor module 100 further includes a processor 120 to process the pixel data for different applications. For example, processor 120 can operate an imaging application and can reconstruct the image of the scene based on the pixel data. Processor 120 can also operate a computer vision (CV) application, a machine learning (ML) application, etc. to analyze the image for various other applications, such as object detection and identification, performing ranging operation, tracking a location of the device that includes the sensor module, etc. In some examples, sensor 102 and processor 120 can be combined into the same chip (e.g., housed within the same package, monolithically integrated on the same substrate, etc.).

As shown in FIG. 1, to reduce a horizontal footprint (e.g., on the x-y plane) of image sensor module 100, image sensor 102 and processor 120 (as well as cover glass 112) can be arranged to form a vertical stack of devices (e.g., along the z-axis). Image sensor module 100 may include a circuit board 130 to provide electrical connections to image sensor 102 and processor 120 in the stack. For example, processor 120 can include flip-chip connectors (e.g., flip-chip connectors 132), bond wires, etc., which can be soldered onto pads 134 of circuit board 130. Circuit board 130 can include a rigid flex printed circuits board. Moreover, image sensor module 100 may include bond wires 136a and 136b which can be soldered onto pads 138a and 138b of circuit board 130 to provide electrical connections between image sensor 102 and circuit board 130. Circuit board 130 can include circuitries to provide electrical connections between pads 134 and 138 to enable communication between image sensor 102 and processor 120. Cover 104 can be mounted on circuit board 130 to enclose image sensor 102 and processor 120 to form a chip package. Circuit board 130 may include connectors 140 to provide electrical connections between image sensor module 100 and other components of the mobile device (e.g., power supply).

Figure 2A:
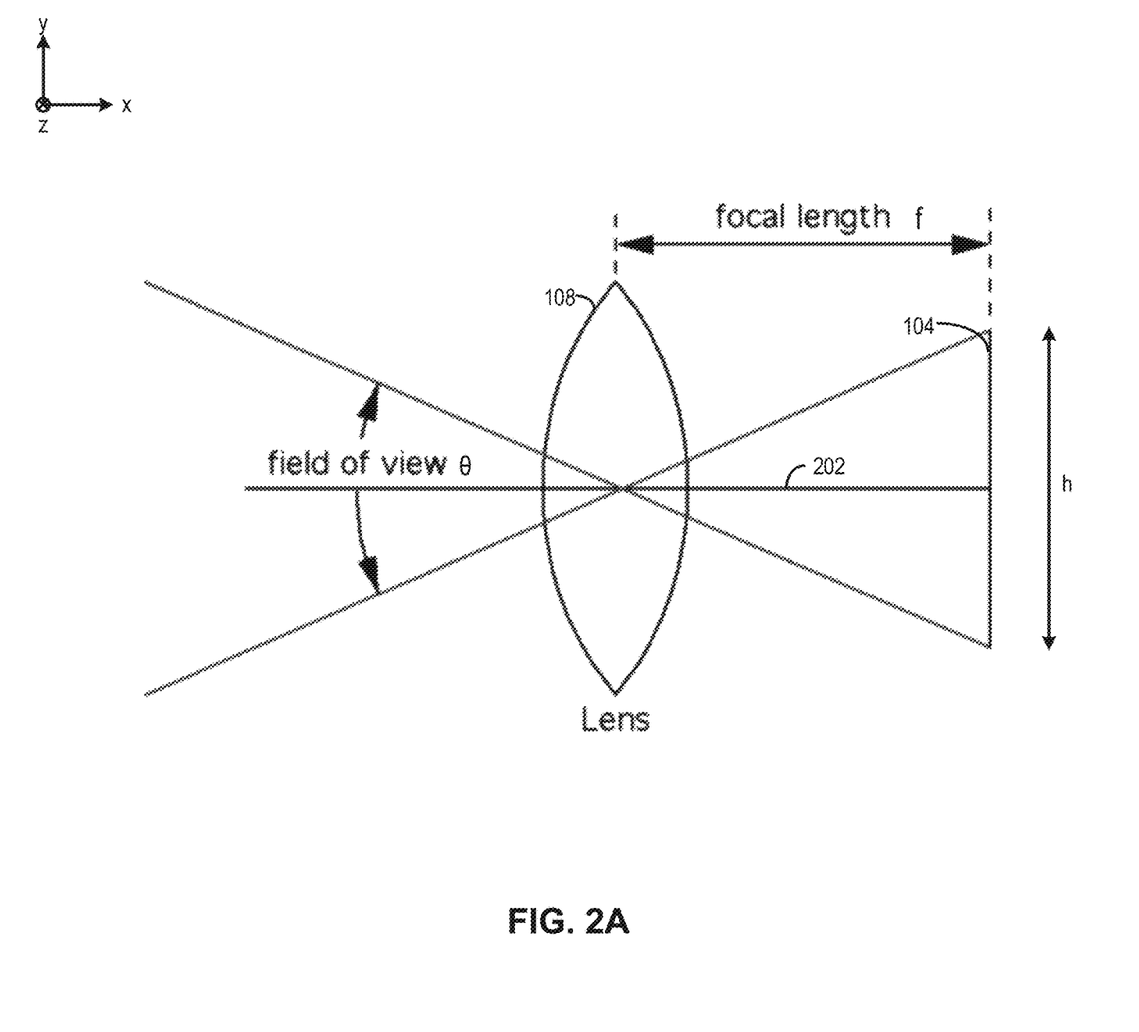
FIG. 2A and FIG. 2B illustrate examples of FOVs of an image sensor.

As shown in FIG. 1, image sensor module 100 can provide a field-of-view (FOV) 150 for imaging. FOV 150 can have an angle of θ around an axis 160 perpendicular to circuit board 130. In FIG. 1, axis 160 can align with, for example, the z-axis when circuit board 130 is parallel with x-y plane. FOV 150 can be determined based on the geometric properties of lens 108 as well as the dimension of light receiving surface 114 of image sensor 102. FIG. 2A provides an illustration of determination of FOV. As shown in FIG. 2A, with lens 108 having a focal length f, light receiving surface 114 having a dimension h on the horizontal plane (e.g., x-y plane), the FOV angle θ on the horizontal plane can be determined based on the following equation:

$$\theta = 2\arctan\left(\frac{h}{2f}\right) \qquad \text{(Equation 1)}$$

In Equation 1, arctan is inverse of the tangent function. FOV angle θ can be centered around principle axis 202 of lens 108, which also goes through the center of lens 108.

Figure 2B:
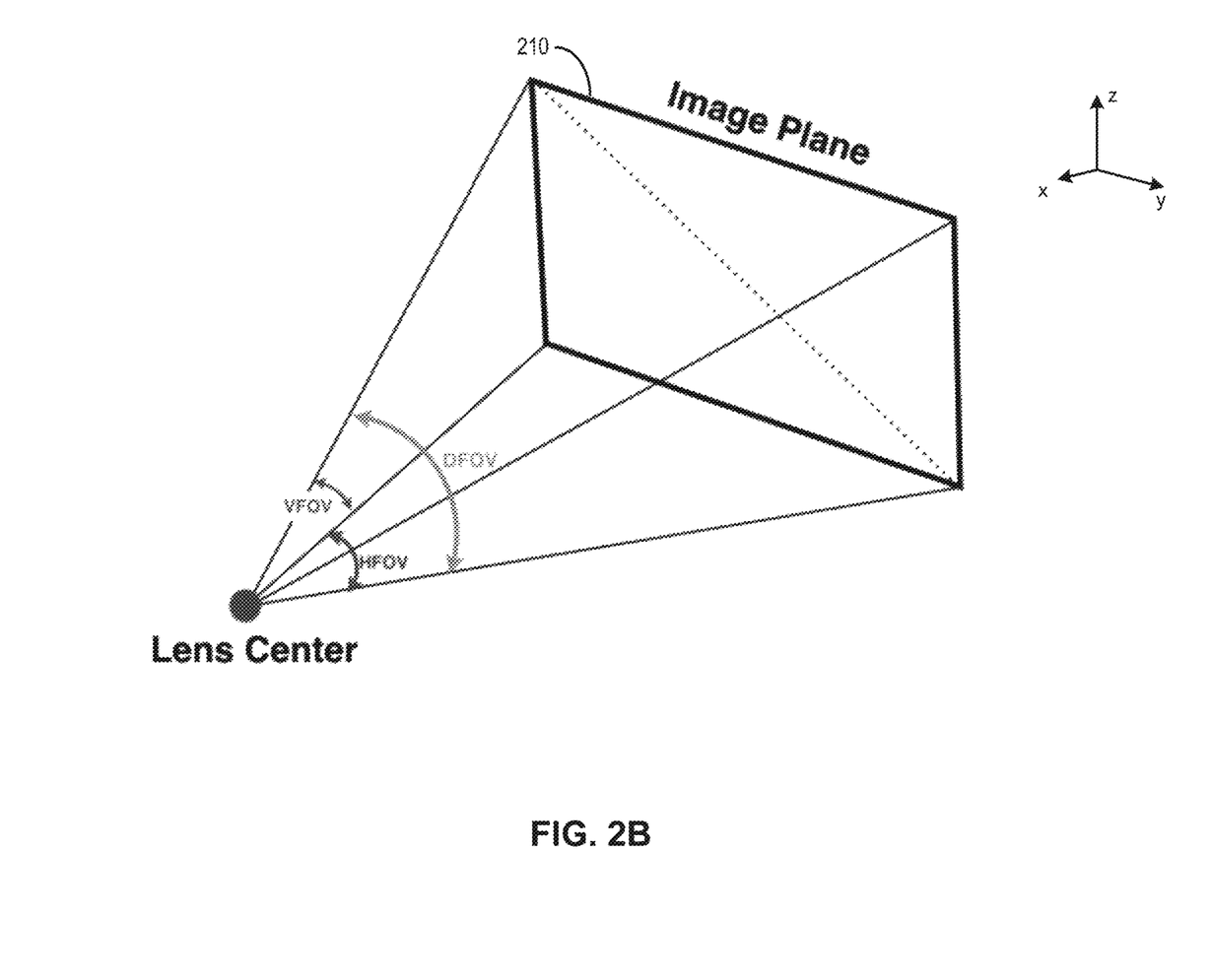

The FOV can be defined on different planes. In the example of FIG. 2A, FOV angle θ can be a horizontal FOV (HOV) on the horizontal x-y plane. Referring to FIG. 2B, a vertical FOV (VFOV) can be defined on a vertical plane (e.g., on x-z or y-z plane), whereas a diagonal FOV (DFOV) can be defined on a diagonal plane formed on a diagonal axis of an image plane 210 that is parallel with the z-y plane. In a case where light receiving surface 114 of image sensor 102 is parallel with image plane 210, the FOV angle θ of image sensor module 100 in FIG. 1 can be an HOV.

As described above, it is desirable that image sensor 102 has a wide FOV, such that image sensor 102 can image a larger area of a scene and can capture more information about the scene in an image. Referring back to Equation 1, one way to increase the FOV is by decreasing the focal length of lens 108, but doing so can increase optical aberrations, such as Seidel aberrations, which can increase blurriness and reduce the resolution of the imaging operation.

Figure 3A:
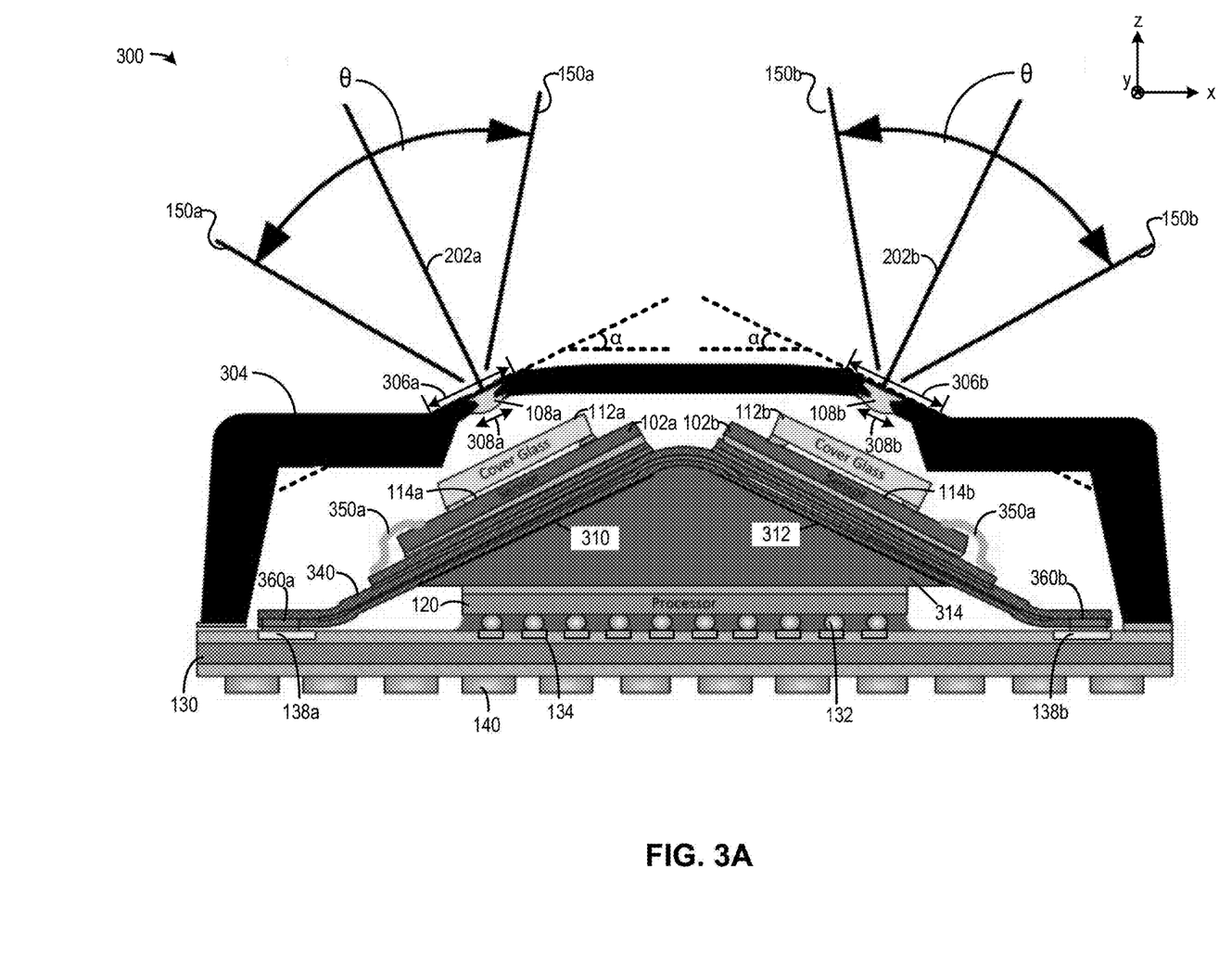
FIG. 3A, FIG. 3B, and FIG. 3C illustrate other examples of an image sensor module according to embodiments of the present disclosure.

FIG. 3A illustrates an example of an image module 300 which can provide a widened FOV based on combining FOVs of multiple lens. Image sensor module 300 can be part of a mobile device such as, for example, a smart phone, a laptop, a camera, an Internet-of-Thing (IoT) device, etc. As shown in FIG. 3A, sensor module 300 includes a cover 304 mounted on circuit board 130. Cover 304 can have side surfaces 306a and 306b each forms an angle α with respect to circuit board 130. Side surface 306a includes an opening 308a for mounting a lens 108a, whereas side surface 306b includes an opening 308b for mounting a lens 108b. Side surfaces 306a and 306b (and/or openings 308a and 308b) are configured such that the principle axis 202a of lens 108a has a different orientation from the principle axis 202b of lens 108b.

Image module 300 further includes image sensors 102a and 102b positioned below, respectively, lens 108a and 108b. Image sensors 102a and 102b can be oriented such that each is parallel with, respectively, side surfaces 306a and 306b and forms angle α with respect to circuit board 130. With such arrangements, light receiving surfaces 140a and 140b of image sensors 102a and 102b are perpendicular to, respectively, principle axes 202a and 202b of lens 108a and lens 108b. Image sensors 102a and 102b can be supported on, respectively, surfaces 310 and 312 of a support structure 314, which can be of a triangular shape, a prism shape, or other arbitrary shape. Support structure 314 can include materials such as polymer, glass, or other suitable material. Image sensor module 300 may further include a cover glass 112a and a cover glass 112b mounted on light receiving surfaces 114a and 114b to protect the image sensors. Image sensor module 300 may further include a filter array (not shown in FIG. 3A) to control the wavelength of light received by each pixel cell of the image sensors. Image module 300 further includes processor 120 sandwiched between support structure 314 and circuit board 130 to form a stack structure and to reduce the foot print of image module 300.

Image sensor 102a can detect light that passes through lens 108a, which can provide an FOV 150a for image sensor 102a on surface 310 to generate pixel data. Image sensor 102b can light that passes through lens 108b, which can provide an FOV 150b for image sensor 102b on surface 312 to generate pixel data. In a case where image sensor module 300 is mounted on a vertical image plane (e.g., z-y plane, z-x plane, etc.), both FOVs 150a and 150b can be horizontal FOVs. Processor 120 can combine the image data from image sensors 102a and 102b to generate a combined image having a combined FOV of FOVs 150a and 150b. The combined FOV can be wider than each of FOVs 150a and 150b.

Figure 3B:
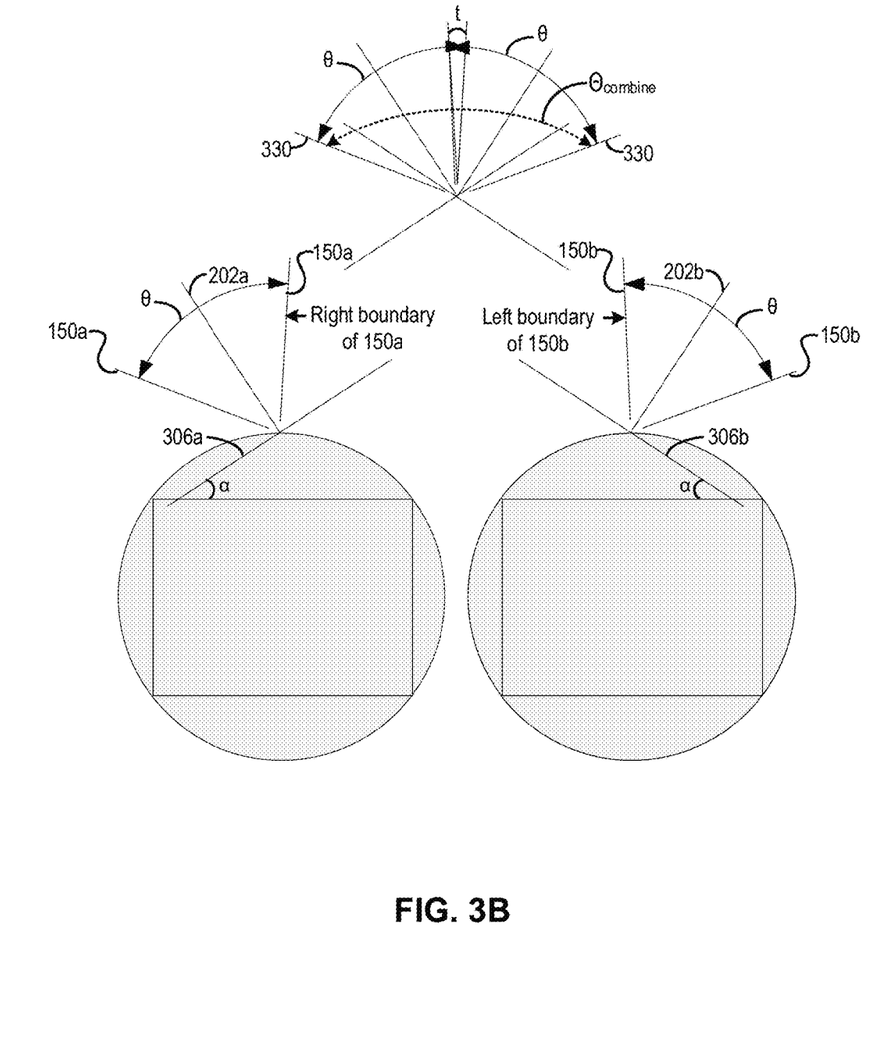

FIG. 3B illustrates an example of widening of a FOV (e.g., HFOV) based on combining FOV 150a and FOV 150b. For example, referring to FIG. 3B, each of FOVs 150a and 150b may have an angle θ centered around, respectively, principle axes 202a and 202b. In some examples, θ can have a range between 72-100 degrees.

Side surfaces 306a and 306b (and principle axes 202a and 202b) are oriented such that FOVs 150a and 150b has an overlap angle t. In some examples, the overlap angle t can have a range between 6-44 degrees.

A combined FOV 330, formed by combining the pixel data output by image sensors 102a and 102b, can have an angle $\theta_{combine}$ based on the following equation:

$$\theta_{combine}=2\times\theta-t \quad \text{(Equation 2)}$$

The above Equation can be based on an assumption that the image plane being viewed is far compared to the distance between sensors 306a and 306b. In a case where θ is 72 degrees and t is 6 degrees, a combined FOV of 138 degrees (72×2-6) can be achieved. In a case where θ is 100 degrees and t is 44 degrees, a combined FOV of 156 degrees (100×2-44) can be achieved.

Processor 120 can post-process an image frame from each of image sensors 102a and 102b, each corresponding to respectively FOV 150a and FOV 150b, to generate a combined image frame corresponding to a combine FOV 330. For example, processor 120 can identify pixels of an object that is captured in both image frames to be in the overlapped angle t of combined FOV 330, while the rest of the pixels are in the non-overlapped portions of combined FOV 330. Processor 120 can also perform transformation of the pixel data in the image frames from image sensors 102a and 102b to generate the combined image frame to account for the differences in the orientation of principle axis between, for example, image sensor 102 of FIG. 1 and image sensors 102a and 102b of FIG. 3A.

With such arrangements, each of image sensors 102a and 102b can provide pixel data corresponding to, respectively, FOVs 150a and 150b to processor 120, which can combine the pixel data to obtain an image corresponding to FOV 330, which is wider than both of FOVs 150a and 150b. Moreover, each of lens 108a and 108b can be identical to lens 108 of FIG. 1 and their geometric properties (e.g., focal lengths) need not be adjusted to widen the FOV, which enables increasing the overall FOV of image module 300 without introducing additional optical aberrations. Although FIG. 3A and FIG. 3B illustrates that image sensor module 300 provides a widened HFOV, it is understood that the techniques disclosed in this disclosure can be applied to widen VFOV, DFOV, etc., based on adjusting the orientations of side surfaces 306a and 306b, which can set the orientations of the principle axes of lens 108a and 108b.

The orientations of side surfaces 306a and 306b, as well as the principle axes 202a and 202b of lens 108a and 108b, can be configured based on a target combined FOV 330. For example, as shown in FIG. 3B, each of side surfaces 306a and 306b can form an angle α with respect to x axis. Angle α can be chosen to set the orientations of the right boundary of FOV 150a and the left boundary of FOV 150b, which in turn set the overlap angle t between the right boundary of FOV 150a and the left boundary of FOV 150b.

Figure 3C:
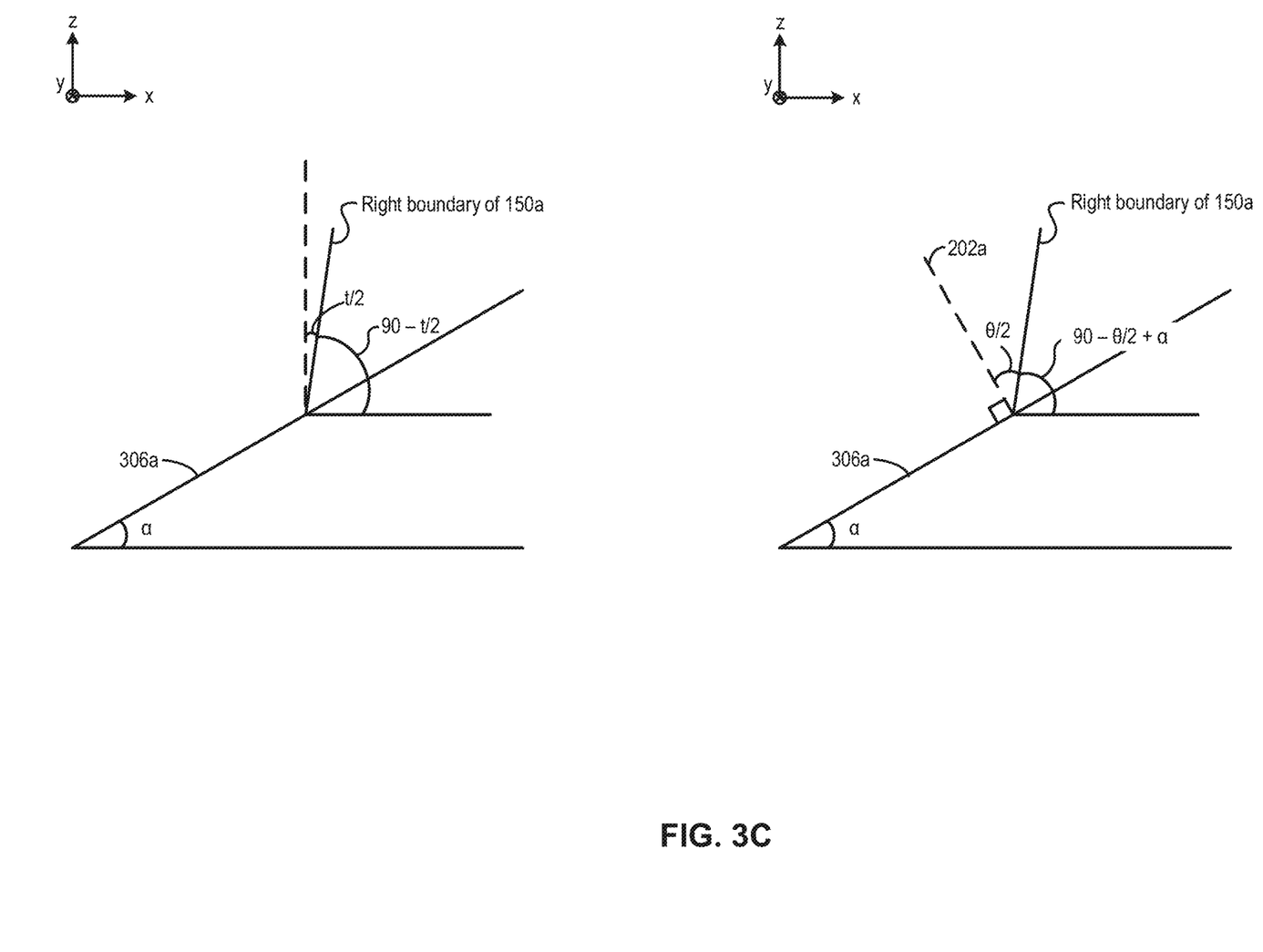

Given the angle θ of FOVs 150a and 150b and a target FOV 330, the overlap angle t can be determined from Equation 2 above, and angle α can be set based on overlap angle t. FIG. 3C illustrates example relationship between angle α and overlap angle t. As shown on the left of FIG. 3C, with overlap angle t, the right boundary of FOV 150a forms an angle of t/2 with respect to axis 332 which can be perpendicular to the x-y plane, and an angle of 90−t/2 with respect to x-y plane. Moreover, as shown on the right of FIG. 3C, the right boundary of FOV 150a also forms an angle of 90−θ/2 with respect to surface 306a, which forms an angle of α with respect to the x-y plane. Therefore, the right boundary of FOV 150a can form an angle of 90−θ/2+α with respect to the x-y plane. A relationship between angle t and α can be based on the following equation:

$$t/2=\theta/2-\alpha \quad \text{(Equation 3)}$$

In a case where θ is 72 degrees and t is 6 degrees, α can be equal to 33 degrees. In a case where θ is 100 degrees and t is 44 degrees, α can be equal to 28 degrees.

Moreover, the size of angle α can also be constrained such that there is at least some overlap between the right boundary of FOV 150a and the left boundary of FOV 150b (e.g., t has to be at least zero or positive).

Referring back to FIG. 3A, image module 300 may include a circuit board 340 as well as circuit board 130 to provide electrical connections to image sensors 102a and 102b as well as processor 120. Circuit board 340 can also include a rigid flex circuit board and can be bended to conform to the shape of support structure 314. Circuit board 340 can be bonded to surfaces 310 and 312 with, for example, epoxy materials. Sensors 102a and 102b can be electrically connected to circuit board 340 via, respectively, bond wires 350a and 350b. In some examples, sensors 102a and 102b can also be electrically connected to circuit board 340 via flip chip. Two ends of circuit board 340 may include pads 360a and 360b that can be soldered to pads 138a and 138b of circuit board 130, such that support structure 314 becomes sandwiched between circuit board 130 and circuit board 340.

Moreover, processor 120 can include flip-chip connectors (e.g., flip-chip connectors 132), bond wires, etc., which can be soldered onto pads 134 of circuit board 130. Circuit board 130 can include circuitries to provide electrical connections between pads 134 and 138 to enable communication between image sensor 102 and processor 120. Cover 304 can be mounted on circuit board 130 to enclose image sensor 102 and processor 120. Circuit board 130 may include connectors 140 to provide electrical connection among sensors 102a and 102b, processor 120 and other components of the mobile device (e.g., power supply).

Figure 4:
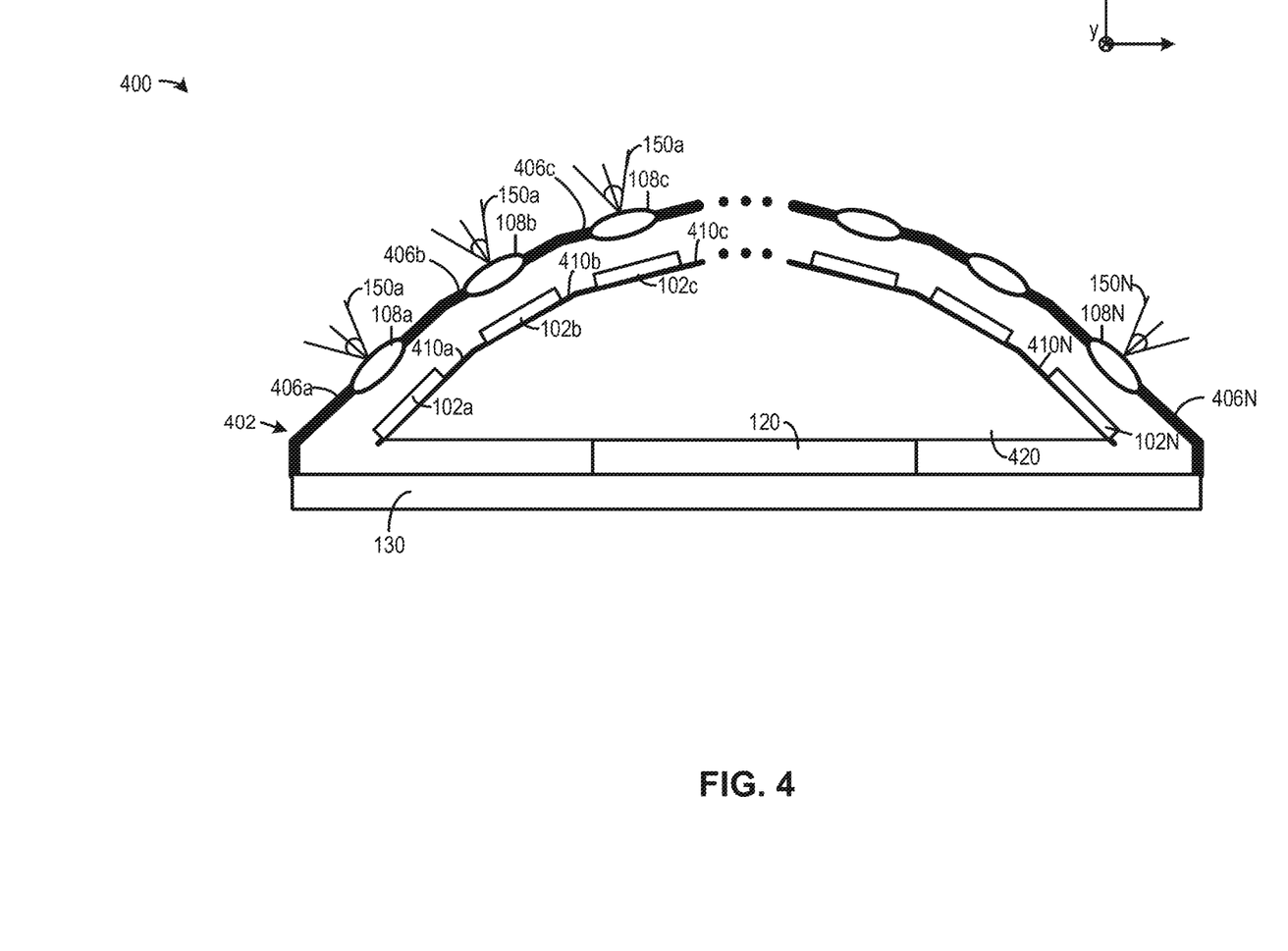
FIG. 4 illustrates other examples of an image sensor module according to embodiments of the present disclosure.

Although FIG. 3A and FIG. 3B illustrates that two lens 108a and 108b are used to provide a widened FOV, it is understood that more than two lens can be used. FIG. 4 illustrates an example of an image module 400 including more than two lens. As shown in FIG. 4, image module 400 may include a cover 402 and include multiple steps including steps 406a, 406b, . . . 406N. Each step can hold a lens 108 (e.g., lens 108a, 108b, . . . 108N). Each lens have a FOV 150 (e.g., FOV 150a, 150b, . . . 150N) each has an angle of θ. Each step 406 and lens 108 corresponds to an image sensor 102 (e.g., image sensors 102a, 102b, 102N) positioned on a surface 410 (e.g., 410a, 410b, . . . 410N) of multi-faced support structure 420. Image module 400 can provide a combined FOV equal to the sum of the FOVs of the lens minus the total overlap angles between pairs of neighboring lens (e.g., lens 108a and 108b, lens 108b and 108c, etc.).

Figure 5A:
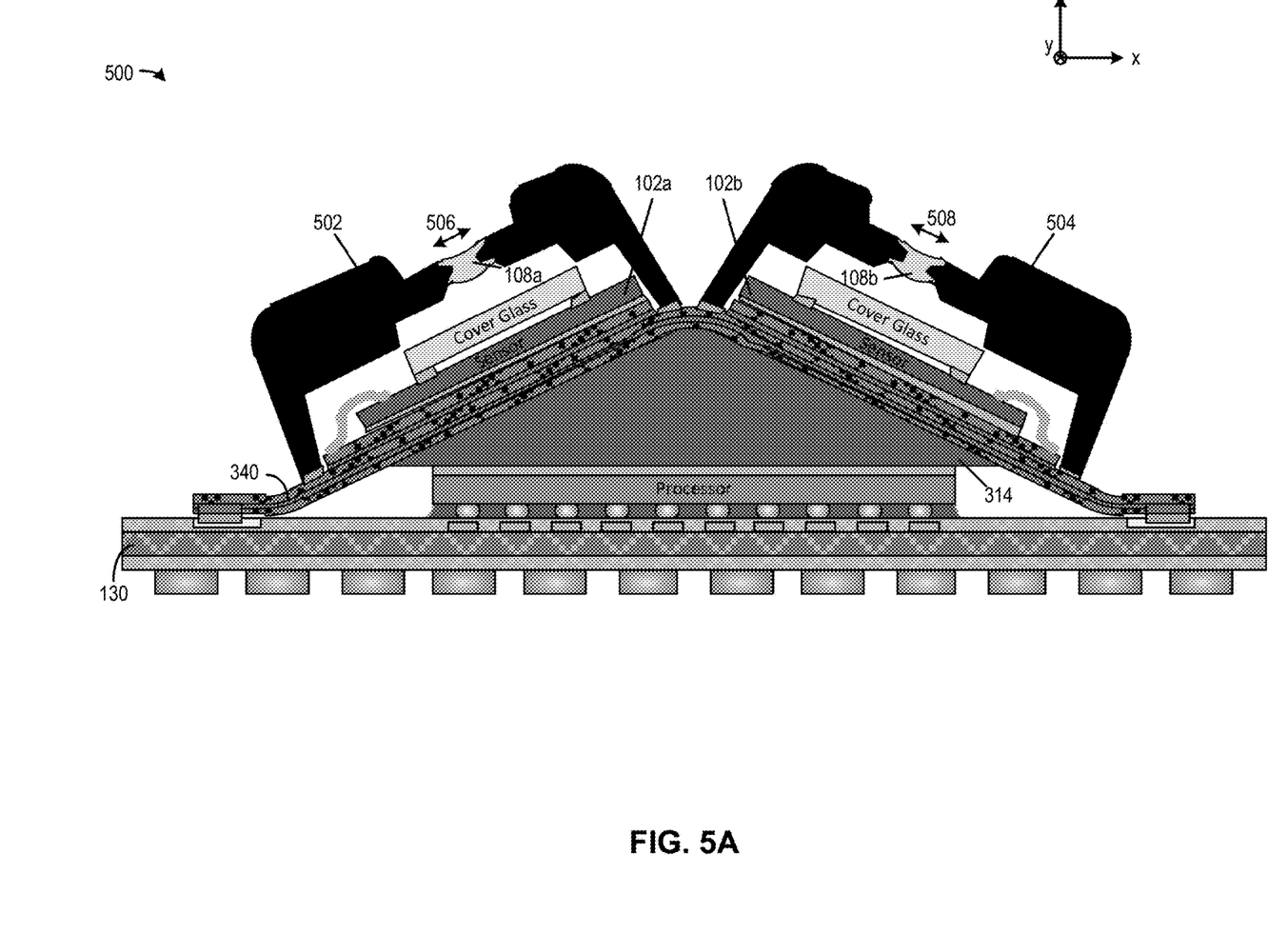
FIG. 5A and FIG. 5B illustrate other example of an image sensor module according to embodiments of the present disclosure.
Figure 5B:
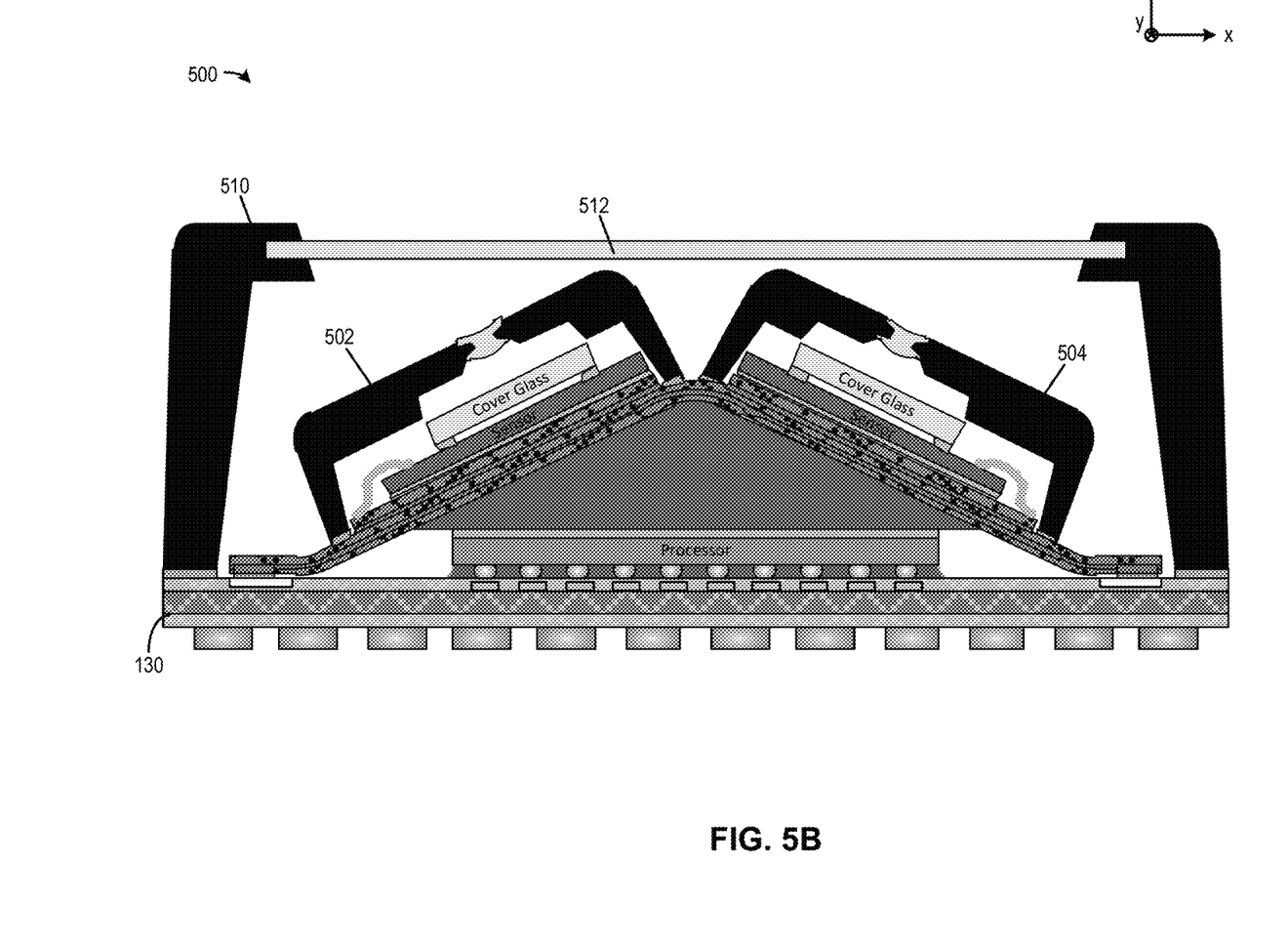

FIG. 5A and FIG. 5B illustrate other examples of an image module that can widen FOV. Image module 500 includes mostly the same components as image module 300 except that image module 500 includes two covers 502 and 504 mounted on circuit board 340 to cover, respectively, image sensors 102a and 102b, to form a dual sensor package. Circuit board 340 in turn is mounted on support structure 314 so that image sensor 102a and 102b have different orientations to widen the combined FOV. Cover 502 includes an opening 506 to mount lens 108a, whereas cover 504 includes an opening 508 to mount lens 108b. In some examples, as shown in FIG. 5B, image module 500 can further include a lens carrier 510 having a transparent lid 512 mounted on circuit board 130 to protect the dual sensor package.

Figure 6:
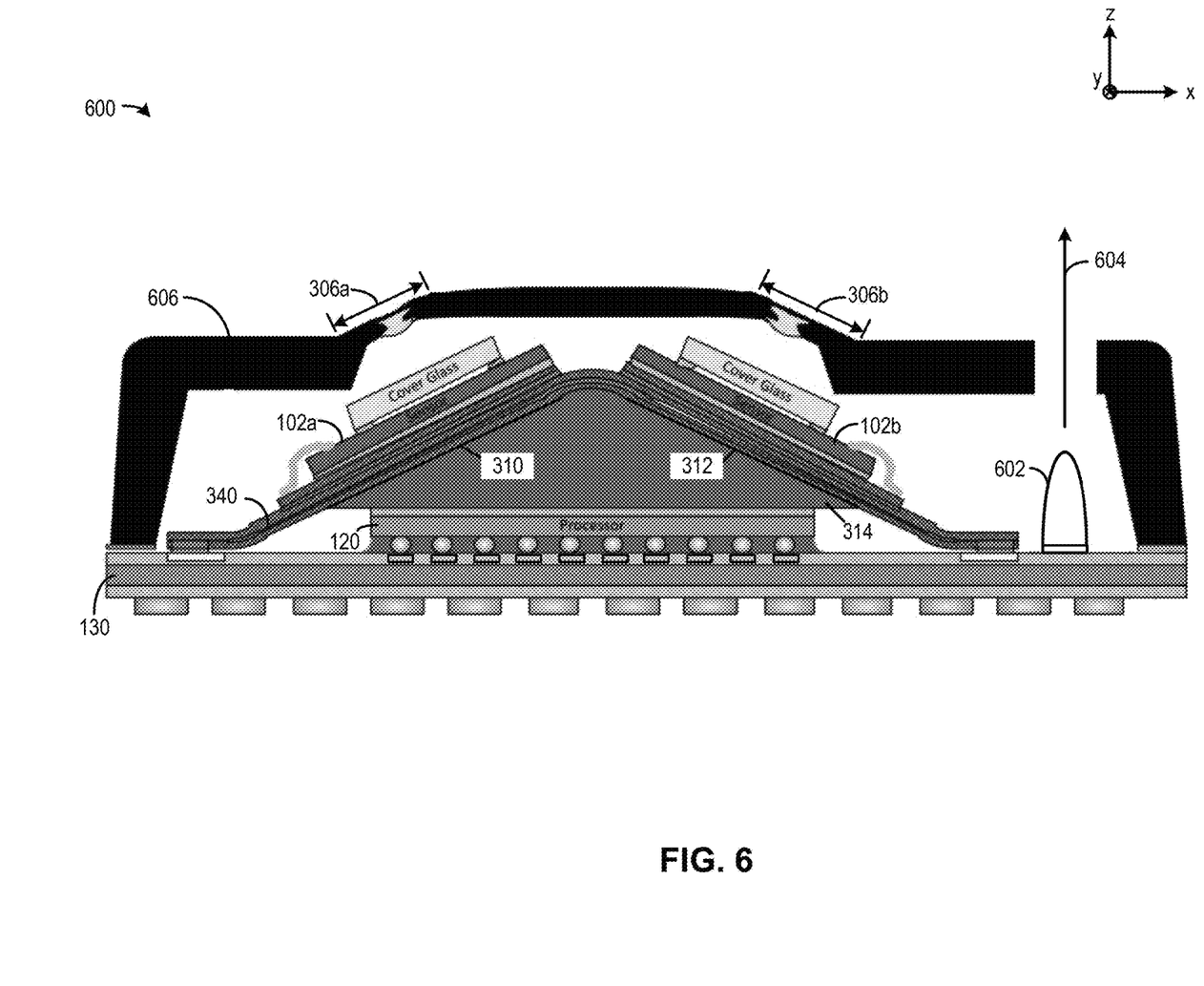
FIG. 6 illustrates other examples of an image sensor module according to embodiments of the present disclosure.

FIG. 6 illustrates another example of an image module 600. Image module 600 includes mostly the same components as image module 300, including image sensors 102a and 102b mounted on circuit board 340, which in turn is mounted on support structure 314 so that image sensor 102a and 102b have different orientations to widen the combined FOV. Support structure 314 is mounted on circuit board 130. In addition, image module 600 can include an illuminator 602 mounted on circuit board 130. Illuminator 602 can emit, for infra-red light 604 which can include, for example, light pulses, structured light, etc. Illuminator 602 can also emit light of other wavelength ranges, such as monochrome visible light, visible light of a particular color (e.g., one of red/green/blue), etc.

In some examples, processor 120 can synchronize/coordinate the operation of illuminator 602 with the operation of image sensors 102a and 102b to perform a ranging operation. For example, in a case where illuminator 602 emits infra-red light pulses, processor 120 can set a first time when illuminator 602 emits an infra-red light pulse, and then determine a second time (and/or a third time) when each of image sensors 102a and 102b receives a reflected infra-red light pulse from an object. A time-of-flight of the infra-red light pulse can then be determined based on the difference between the first time and the second time (and third time), and the time-of-flight can be used to determine a distance between the image module and the object. As another example, processor 120 can control illuminator 602 to output structured infra-red light 604 that carries a specific pattern. From the outputs of image sensors 102a and 102b, processor 120 can determine orientations and/or locations of images of the infra-red light pattern, and determine a distance between the image module and the object based on the orientations and/or locations of infra-red light pattern image.

Image module 600 can include a cover 606 which includes openings 308a and 308b to mount, respectively, lens 108a and 108b. In addition, cover 606 further includes an opening 608 to let infra-red light 604 out of image module 600. In some examples, a lens or other optical components (not shown in FIG. 6) can be mounted in opening 608 to set the property of infra-red light 604 such as, for example, focusing the light, filtering out components other than infra-red light, etc. In some examples, illuminator 602 can be external to cover 606. In some examples, image module 600 may also include multiple illuminators formed on, for example, surfaces 310 and 312 of support structure 314, and cover 606 can include additional openings on side surfaces 306a and 306b to let the light out of the illuminators.

Figure 7A:
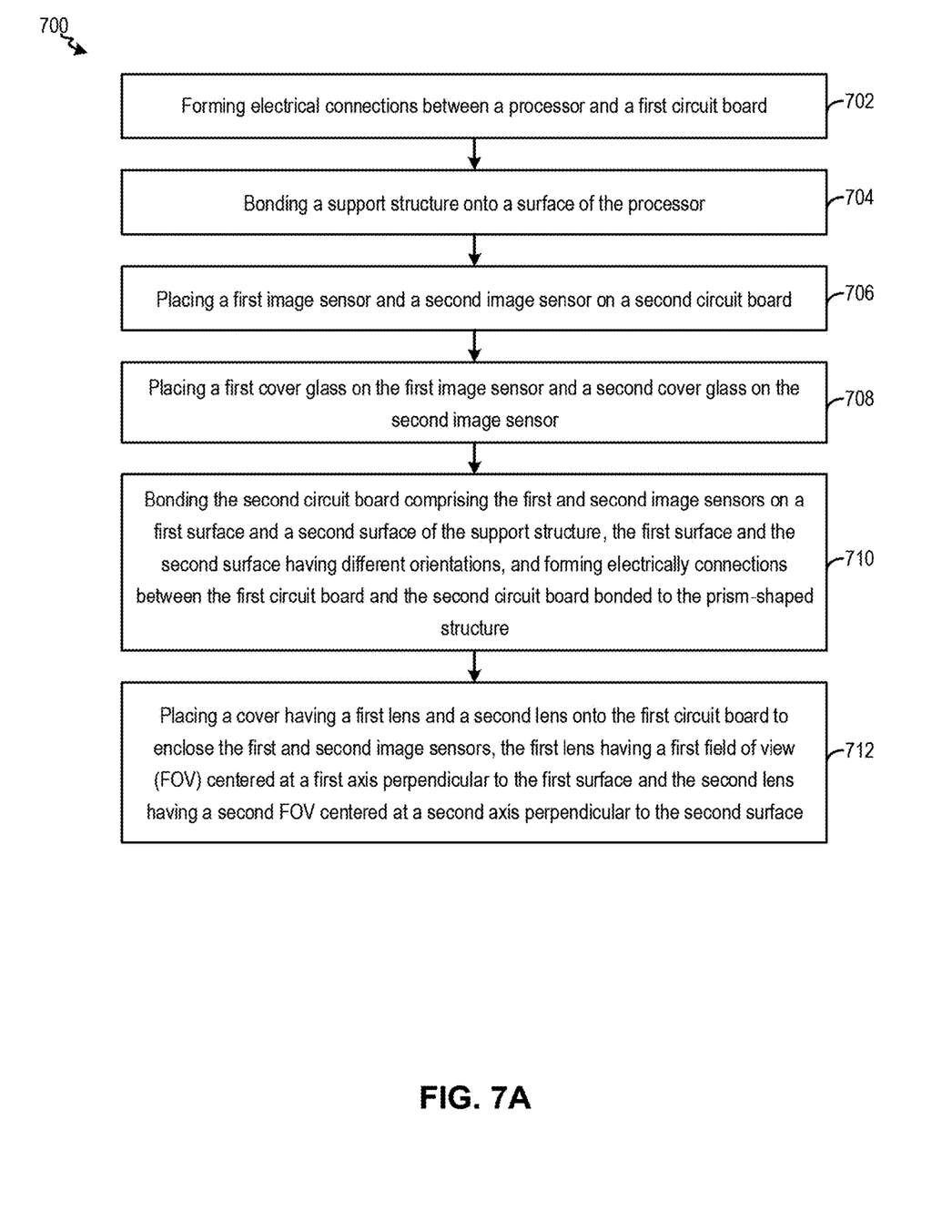
FIG. 7A and FIG. 7B illustrate an example method of fabricating an image sensor module according to embodiments of the present disclosure.
Figure 7B:
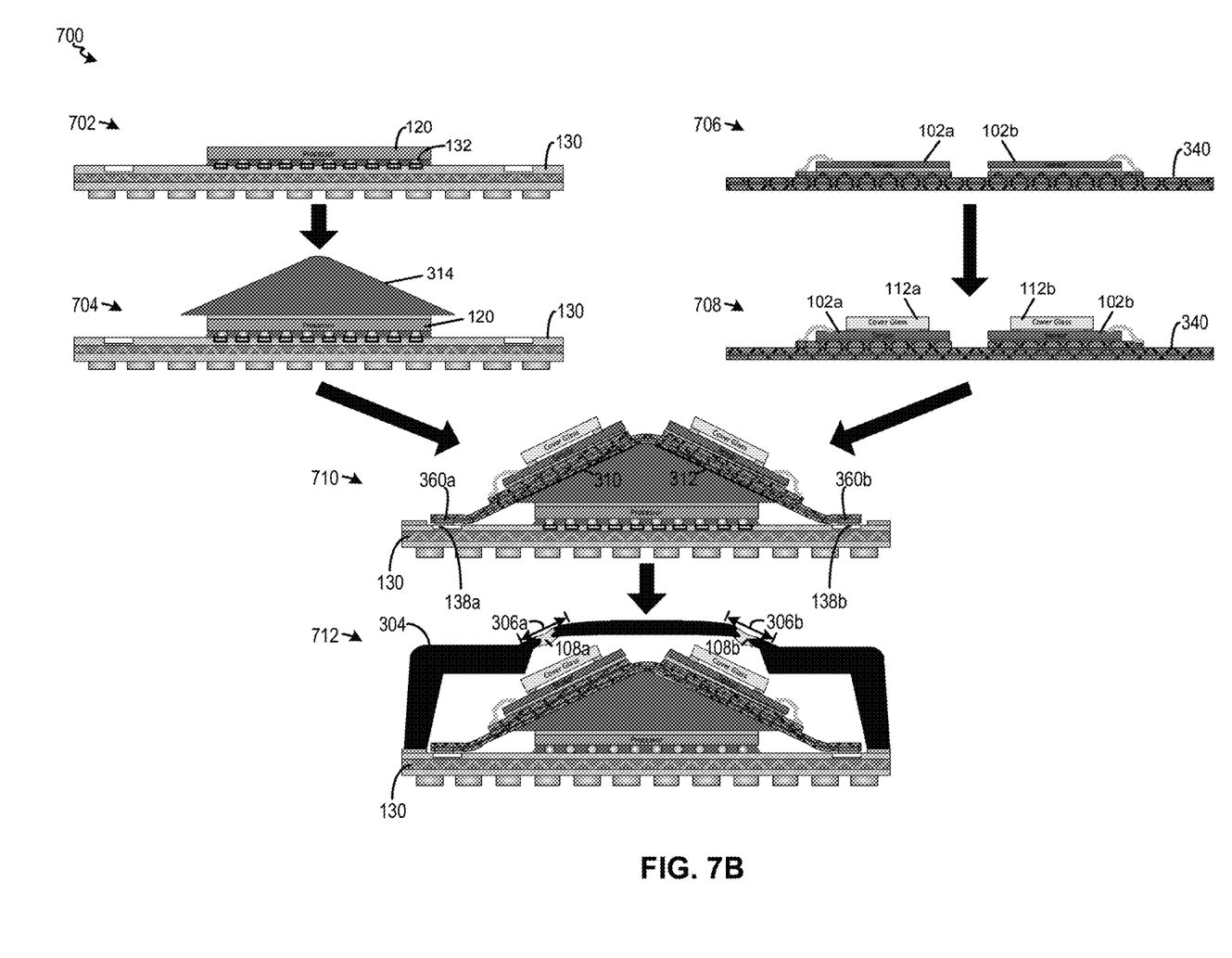

FIG. 7A and FIG. 7B illustrate an example method 700 of fabricating an image sensor module, such as image sensor module 300. Referring to FIG. 7A, in step 702, electrical connections are formed between processor 120 and circuit board 130. The electrical connection can be based on, for example, flip-chip, wire bonding, etc. Circuit board 130 can include a rigid flex circuit board.

In step 704, support structure 314 is bonded with a surface of processor 120 to form a stack. Support structure 314 can be of a triangular shape, a prism-shape, or other arbitrary shape.

In step 706, image sensors 102a and 102b are placed on circuit board 340 which can also include a rigid flex circuit board. Electrical connections are formed between each of image sensors 102a and 102b and circuit board 340. The electrical connections can be based on, for example, flip chip, wire bonding, etc.

In step 708, cover glasses 112a and 112b are placed on, respectively, image sensors 102a and 102b.

In step 710, circuit board 340, which now includes image sensors 102a and 102b, can be bonded to surfaces 310 and 312 of support structure 314. The bonding can be based on epoxy materials. Surfaces 310 and 312 have different orientations. Electrical connections can also be formed between circuit board 340 and circuit board 130. The electrical connections can be formed by, for example, soldering pads 360a and 360b on two sides of circuit board 340 to, respectively, pads 138a and 138b of circuit board 130. In some examples, the soldering of the two sides of circuit board 340 to circuit board 130 can be performed simultaneously using a hot bar. In some examples, the electrical connections can also be formed by bond wires between circuit board 340 and circuit board 130.

In step 712, cover 304 having lens 108a and 108b mounted in surfaces 306a and 306b can be placed on circuit board 130 to enclose image sensors 102a and 102b. Lens 108a and 108b are oriented such that principle axis 202a of lens 108a is perpendicular to surface 310 and principle axis 202b of lens 108b is perpendicular to surface 312.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. An apparatus comprising:
   one or more covers having at least a first opening and a second opening;
   a first lens mounted in the first opening and having a first field of view (FOV) centered at a first axis having a first orientation;
   a second lens mounted in the second opening and having a second FOV centered at a second axis having a second orientation different from the first orientation;
   a support structure having a first surface perpendicular to the first axis and a second surface perpendicular to the second axis;
   a first circuit board bonded with the first surface and the second surface of the support structure;
   a first image sensor housed within the one or more covers and positioned on the first circuit board, the first image sensor configured to detect light via the first lens;
   a second image sensor housed within the one or more covers and positioned on the first circuit board, the second image sensor configured to detect light via the second lens, and
   a second circuit board bonded with the first circuit board, the support structure being positioned between the first circuit board and the second circuit board,
   wherein the first image sensor and the second image sensor are configured to provide, based on the detected light, image data of a combined FOV larger than each of the first FOV and the second FOV.

2. The apparatus of claim 1, wherein the first circuit board is bonded with the first surface and the second surface of the support structure with an epoxy material.

3. The apparatus of claim 1, wherein two ends of the first circuit board are bonded with the second circuit board.

4. The apparatus of claim 1, wherein each of the first circuit board and the second circuit board includes a rigid-flex circuit board.

5. The apparatus of claim 1, further comprising a processor bonded with the second circuit board and electrically connected to the first image sensor and the second image sensor,
   wherein the processor is configured to:
      receive a first image frame from the first mage sensor corresponding to the first FOV;
      receive a second image frame from the second image sensor corresponding to the second FOV; and
      generate a combined image frame corresponding to the combined FOV based on the first image frame and the second image frame.

6. The apparatus of claim 5, wherein the processor is configured to generate the combined image frame based on identifying pixels of an object captured in both the first image frame and the second image frame.

7. The apparatus of claim 5, wherein the processor is positioned between the support structure and the second circuit board.

8. The apparatus of claim 5, wherein the processor is electrically connected to the second circuit board via at least one of: flip chip connectors or bond wires.

9. The apparatus of claim 5, wherein the one or more covers include one cover mounted on the second circuit board.

10. The apparatus of claim 5, wherein the one or more covers include a first cover having the first opening and a second cover having the second opening;
    wherein the first cover is formed on the first surface of the support structure; and
    wherein the second cover is formed on the second surface of the support structure.

11. The apparatus of claim 10, further comprising a third cover having a transparent lid;
    wherein the third cover is formed on the second circuit board; and
    wherein the transparent lid allows light to reach the first lens and the second lens.

12. The apparatus of claim 1, further comprising an illuminator configured to emit the light.

13. The apparatus of claim 3, wherein the two ends of the first circuit board comprise first pads;
    wherein the second circuit board comprises second pads; and
    wherein the first pads at the two ends of the first circuit board are soldered to the second pads of the second circuit board.

* * * * *